United States Patent
Dong et al.

(10) Patent No.: US 9,014,252 B2
(45) Date of Patent: Apr. 21, 2015

(54) BAND-PASS HIGH-ORDER ANALOG FILTER BACKED HYBRID RECEIVER EQUALIZATION

(75) Inventors: Yikui (Jen) Dong, Cupertino, CA (US); Cathy Ye Liu, San Jose, CA (US); Freeman Yingquan Zhong, San Ramon, CA (US)

(73) Assignee: LSI Corporation, Milpitas, CA (US)

(*) Notice: Subject to any disclaimer, the term of this patent is extended or adjusted under 35 U.S.C. 154(b) by 2228 days.

(21) Appl. No.: 11/634,645

(22) Filed: Dec. 6, 2006

(65) Prior Publication Data

US 2008/0069191 A1 Mar. 20, 2008

Related U.S. Application Data

(60) Provisional application No. 60/825,805, filed on Sep. 15, 2006.

(51) Int. Cl.
| | |
|---|---|
| *H03K 5/159* | (2006.01) |
| *H03K 5/01* | (2006.01) |
| *H04B 1/10* | (2006.01) |
| *H04L 25/03* | (2006.01) |

(52) U.S. Cl.
CPC .... *H04L 25/03178* (2013.01); *H04L 25/03057* (2013.01); *H04L 2025/03356* (2013.01)

(58) Field of Classification Search
CPC .............. H04L 25/03178; H04L 25/03057; H04L 2025/03356
USPC ......... 375/233, 229, 219, 257, 316, 317, 346, 375/350, 348
See application file for complete search history.

(56) References Cited

U.S. PATENT DOCUMENTS

| | | | | |
|---|---|---|---|---|
| 3,990,046 A | * | 11/1976 | Katz et al. ................... | 709/230 |
| 5,025,469 A | * | 6/1991 | Bingham ................ | 379/100.17 |
| 5,754,961 A | * | 5/1998 | Serizawa et al. ............. | 455/517 |
| 5,991,349 A | * | 11/1999 | Chen ............................ | 375/355 |
| 6,052,349 A | * | 4/2000 | Okamoto ................... | 369/47.26 |
| 6,289,063 B1 | * | 9/2001 | Duxbury ....................... | 375/348 |
| 6,415,003 B1 | * | 7/2002 | Raghavan .................... | 375/317 |

(Continued)

FOREIGN PATENT DOCUMENTS

JP        08186524        *   7/1996

*Primary Examiner* — Betsy Deppe
(74) *Attorney, Agent, or Firm* — Daniel J. Santos; Smith Risley Tempel Santos LLC

(57) ABSTRACT

A channel equalization scheme is provided. A linear equalizer using a continuous-time linear equalization and a decision feedback equalizer using a discrete-time decision feedback equalization are integrated together from a hybrid receiver equalizer. The continuous-time linear equalization scheme and the discrete-time decision feedback equalization scheme are blended using a joint adaptation algorithm to form an equalization scheme for inter-symbol interference cancellation in the hybrid receiver equalizer. The hybrid receiver equalizer controls crosstalk while maintaining signal bandwidth and linearity of a signal by the high-order high frequency roll-off of the linear equalizer used. Using this configuration, the hybrid receiver equalizer eliminates the need for adaptive bandwidth controller used in conventional low-pass receiver equalization schemes. The hybrid receiver equalizer can be used in receivers for dual-speed simultaneous transmission on the same physical link. The hybrid receiver equalizer can also be used in receivers for simultaneous forward and back-channel transmission using differential-signaling in multi-Gbps transceivers.

17 Claims, 12 Drawing Sheets

(56) References Cited

U.S. PATENT DOCUMENTS 7,599,431 B1* 10/2009 Anderson et al. ............ 375/229
2005/0019042 A1* 1/2005 Kaneda et al. ................ 398/208
2005/0135471 A1* 6/2005 Tonietto et al. ............... 375/233

* cited by examiner

Signal-to-noise Ratio (SNR) Improvement

| BP | SNR w/o LE | SNR w/t LE |
|---|---|---|
| CAT 6K | 25.8 dB | 26.2 dB |
| LSI 35" | 23.9 dB | 27.1 dB |
| LSI 45" | 21.9 dB | 25.8 dB |
| Tellabs 1 | 26.5 dB | 29.2 dB |
| Tellabs 2 | 25.8 dB | 29.2 dB |
| Tellabs 3 | 25.5 dB | 28.8 dB |

Vector of Equalizer Gain.

| $i_k$ | $g_{le}(i_k)$ |
|---|---|
| 0 | 0 |
| 1 | 0.143 |
| 2 | 0.286 |
| 3 | 0.429 |
| 4 | 0.571 |
| 5 | 0.714 |
| 6 | 0.857 |
| 7 | 1.0 |

Definition of error signal

| $e_k$ | $\hat{a}_k$ | $q_k$ |
|---|---|---|
| -1 | 1 | $\geq \gamma_k$ |
| 1 | 1 | $< \gamma_k$ |
| -1 | -1 | $\geq -\gamma_k$ |
| 1 | -1 | $< -\gamma_k$ |

| Index | h0 (mv) | VGA (dB) |
|---|---|---|
| 0 | 60.0 | 2 |
| 1 | 62.2 | 0 |
| 2 | 64.4 | -2 |
| 3 | 66.7 | -4 |
| 4 | 68.9 | -6 |
| 5 | 71.1 | -8 |
| 6 | 73.3 | -10 |
| 7 | 75.6 | |
| 8 | 77.8 | |
| 9 | 80.0 | |
| 10 | 82.2 | |
| 11 | 84.4 | |
| 12 | 86.7 | |
| 13 | 88.9 | |
| 14 | 91.1 | |
| 15 | 93.3 | |
| 16 | 95.6 | |
| 17 | 97.8 | |
| 18 | 100.0 | |
| 19 | 102.2 | |
| 20 | 104.4 | |
| 21 | 106.7 | |
| 22 | 108.9 | |
| 23 | 111.1 | |
| 24 | 113.3 | |
| 25 | 115.6 | |
| 26 | 117.8 | |
| 27 | 120.0 | |
| 28 | 122.2 | |
| 29 | 124.4 | |
| 30 | 126.7 | |
| 31 | 128.9 | |
| 32 | 131.1 | |
| 33 | 133.3 | |
| 34 | 135.6 | |
| 35 | 137.8 | |
| 36 | 140.0 | |
| 37 | 142.2 | |
| 38 | 144.4 | |
| 39 | 146.7 | |
| 40 | 148.9 | |
| 41 | 151.1 | |
| 42 | 153.3 | |
| 43 | 155.6 | |
| 44 | 157.8 | |
| 45 | 160.0 | |
| 46 | 162.2 | |
| 47 | 164.4 | |
| 48 | 166.7 | |
| 49 | 168.9 | |
| 50 | 171.1 | |
| 51 | 173.3 | |
| 52 | 175.6 | |
| 53 | 177.8 | |
| 54 | 180.0 | |
| 55 | 182.2 | |
| 56 | 184.4 | |
| 57 | 186.7 | |
| 58 | 188.9 | |
| 59 | 191.1 | |
| 60 | 193.3 | |
| 61 | 195.6 | |
| 62 | 197.8 | |
| 63 | 200.0 | |

BAND-PASS HIGH-ORDER ANALOG FILTER BACKED HYBRID RECEIVER EQUALIZATION

The present application claims priority from U.S. Provisional Patent Application No. 60/825,805, filed Sep. 15, 2006, entitled: BAND-PASS HIGH-ORDER ANALOG FILTER BACKED HYBRID RECEIVER EQUALIZATION, the contents of which are incorporated herein by reference.

BACKGROUND OF THE INVENTION

1. Technical Field

The present invention relates generally to the field of data transmission, and in particular to efficient receiver equalization techniques. Still more particularly, the present invention provides power and area efficient high performance equalization scheme for reliable high-speed data transmission.

2. Description of the Related Art

High-speed serializer/deserializer (SERDES) technology has been under active development in the recent 20 years and grows into a multi-billion dollar industry. Nowadays, this technology has been widely used in data storage systems, telecommunications, computer industries and many other fields. The desire for higher transmission bandwidth and speed never stops. Signal transmission involving one transmitter (TX), one pair of transmission media, and one receiver (RX) constitutes a single lane transmission. Ten years ago, people were struggling with designs reaching single lane transmission of 2 Gigabits per second (Gbps) in complementary metal oxide semiconductor (CMOS) technology. Presently, that yard-stick has passed 10 Gbps.

Many legacy backplanes were originally designed for lower speed transmission of less than 3 Gbps. However, there exists eminent commercial value in deploying these backplanes for higher speed data transmission. A backplane is a circuit board, usually a printed circuit board, which connects several connectors in parallel to each other, so that each pin of each connector is linked to the same relative pin of all the other connectors, forming a computer bus. To adapt the existing backplanes for higher speed data transmission, many challenging technical issues must be solved. One issue involves channel non-idealities, which are characteristics of the transmission media that attenuate the transmitted signals. At data rate of 6 Gbps and above, the channel non-idealities causes signal loss, reflections, as wells as significant high frequency crosstalk. Signal loss is the loss of the strength of a signal. Another technical issue is signal reflection, which occurs when a signal is transmitted along a transmission medium and some of the signal power is reflected back to its origin, rather than being carried all the way along the cable to the other end. Reflection happens because of imperfections in the cable causing impedance mismatching and non-linear changes in the cable characteristics.

Crosstalk is a phenomenon by which a signal transmitted on one circuit or channel of a transmission system creates an undesired effect in another circuit or channel. High frequency crosstalk is crosstalk that occurs at high frequency transmissions.

A high-speed transceiver is made up of a high-speed transmitter (TX) and a high-speed receiver (RX), at opposite ends of a transmission medium, such as a backplane. A major consideration for high-speed transceiver design is crosstalk. Crosstalk results from parasitic inductance and capacitance coupling among the connectors, the printed circuit boards (PCB), the package, and the die. A package is the physical enclosure of a silicon chip that projects the connections to the actual chip in the form of pins exposed from the package. A die is the actual silicon on which the circuit is formed. Parasitic inductance and capacitance is impedance that is not taken into account when considering ideal circuit elements. This extra impedance usually has detrimental effects on the operation of circuits, reducing their bandwidth or enhancing their susceptivity to interference. Parasitic inductance and capacitance coupling is the parasitic impedance occurring among the components of a circuit. The amount of parasitic coupling is much stronger at higher frequencies than lower frequencies.

Similar to the insertion loss, crosstalk is frequency dependent. Insertion loss is the decrease in transmitted signal power resulting from the insertion of a device in a transmission channel and is usually expressed relative to the signal power delivered to that same part before insertion.

Crosstalk contributes to the noise portion of the signal-to-noise ratio (SNR) seen at the slicer. A slicer is a single bit analog to digital converter that converts an analog signal to a digital bit 1 when the analog signal passes a certain voltage threshold and to a digital bit 0 when the analog signal voltage falls below the voltage threshold. Signal-to-noise ratio is the ratio of a transmitted signal to the background noise of the transmission medium.

Low-pass filter is a frequency filter circuit that passes low frequency signals and blocks high frequency signals. Conversely, a high-pass filter is a frequency filter circuit passes high frequency signals and blocks low frequency signals. A band-pass filter is a frequency filter circuit that passes a band of frequencies in a frequency bandwidth, while blocking frequencies that fall outside that band.

Transmission channels have inherent frequency bandwidth limitations. Most transmission channels pass frequencies on the low end of the frequency bandwidth without trouble but attenuate high frequencies. In this respect, transmission channels act as low-pass filter. Equalization is a technique to boost the amplitude of high frequencies in the signal so that both low and high frequency content in a signal is preserved through the transmission channel. Equalization is also known as channel equalization. An equalization scheme is a specific equalization technique. An equalizer is a circuit that implements an equalization scheme. A linear equalizer uses only the signal in the forward direction through a transmission channel to perform the equalization. A decision feedback equalizer makes an equalization decision based on feedback of not just the current bit received through the transmission channel but also that of certain previous bits that have previously been received through the transmission channel.

A decision feedback equalizer (DFE) can differentiate between the signal and the crosstalk and can provide equalization without crosstalk enhancement, but the decision feedback equalizer (DFE) does not suppress crosstalk. The amount of crosstalk must be mitigated for reliable link operation represented by high bit-error-rate (BER) rate. A transmitter (TX), a transmission channel, and a receiver (RX) form a transmission link. A link is a transmission link, and the operation of the transmission link is called the link operation. This need for mitigation is especially true for high-speed applications. A bandwidth filter can be applied to increase the signal-to-noise ratio (SNR) by suppressing the crosstalk above the signal-band through its stop-band attenuation. A bandwidth filter is a device that passes frequencies within a certain frequency range or bandwidth, and rejects or attenuates frequencies outside that range. An example of an analog electronic band-pass filter is a resistor-inductor-capacitor (RLC) circuit. These filters can also be created by combining a low-pass filter with a high-pass filter. A signal-band is the frequency range of the valid signal. A stop-band is the frequency range outside of the signal-band. Stop-band attenuation is the rejection of frequencies in the stop-band.

In one currently used technique, adaptive bandwidth controller has been applied between the receiver linear equalizer and the decision feedback equalizer (DFE) to mitigate the amount of crosstalk for hybrid linear and decision feedback equalization in the receiver. However, the adaptive bandwidth controller is problematic in that it couples the linear equalizer and the decision feedback equalizer (DFE). A cleaner way for crosstalk control between the linear equalizer and the decision feedback equalizer (DFE) would therefore be desirable.

To adapt the transmitter pre and post emphasis filters the error information has to be communicated back to the transmitter. A second currently used technique achieves simultaneous forward and back-channels by using the orthogonal property between the differential and common-mode signals to provide a separate pathway on the same physical channel. While in theory, the differential and common-mode signals are orthogonal, in practice, inevitable channel non-idealities lead to signal coupling between modes, causing signal integrity degradation in both domains. The common-mode back-channel transmission appear as noise to the differential receiver, degrading the signal integrity of the forward channel. The common-mode back-channel transmission also degrades the differential receiver's offset and sensitivity performance. As a result, the margin of the forward link degrades. To satisfy the tight noise budget in high performance applications, the back-channel signal has to be limited to a very small swing relative to the forward signal.

On the other hand, the strong differential signal severely degrades low-swing common-mode signaling through crosstalk, and through large common-mode noise that could be comparable to the common-mode signal swing. As a result, the common-mode signaling obtained is not reliable. Therefore, in using the second currently used technique, design trade-offs have to be made between forward and back-channels, which result in a performance hit at both links.

A typical decision feedback equalizer (DFE) has limited operating range in the signal amplitude that the decision feedback equalizer (DFE) can handle. Dynamic signal amplitude adjustment with environmental change is usually required to keep the decision feedback equalizer (DFE) working in the desired range. Some form of gain adaptation in the transmission link is required to keep the transmission relatively error-free over time. The second currently used technique achieves gain adaptation by adapting transmitter swing dynamically through back-channel. However, this approach demands frequent transmitter adjustment and it directly translates to the bandwidth requirement for the back-channel.

Furthermore, simultaneous forward and back-channel transmission on the same physical link is preferred as being the most independent and cost effective way for signal transmission through a physical link. However, when the forward and the back-channel share the same physical link, the forward and back-channels compete for the frequency band resources. The second prior art solves this issue by putting the back-channel and forward-channel signals into orthogonal relationship by using an elaborate common-mode and differential-mode transmission scheme.

However, this scheme suffers from drawbacks as described above. Additionally, changing transmitter signal amplitude in the middle of the transmission creates additional crosstalk on the neighboring channel because the transmitter signal is usually much larger than the receive signal, especially in the long-reach applications. This additional crosstalk is undesirable.

SUMMARY OF THE INVENTION

The illustrative embodiments provide a system and a method for channel equalization. At least one linear equalizer using a continuous-time linear equalization and at least one decision feedback equalizer using a discrete-time decision feedback equalization together form a hybrid receiver equalizer. The continuous-time linear equalization scheme and the discrete-time decision feedback equalization scheme are blended to form an equalization scheme for inter-symbol interference cancellation in the hybrid receiver.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
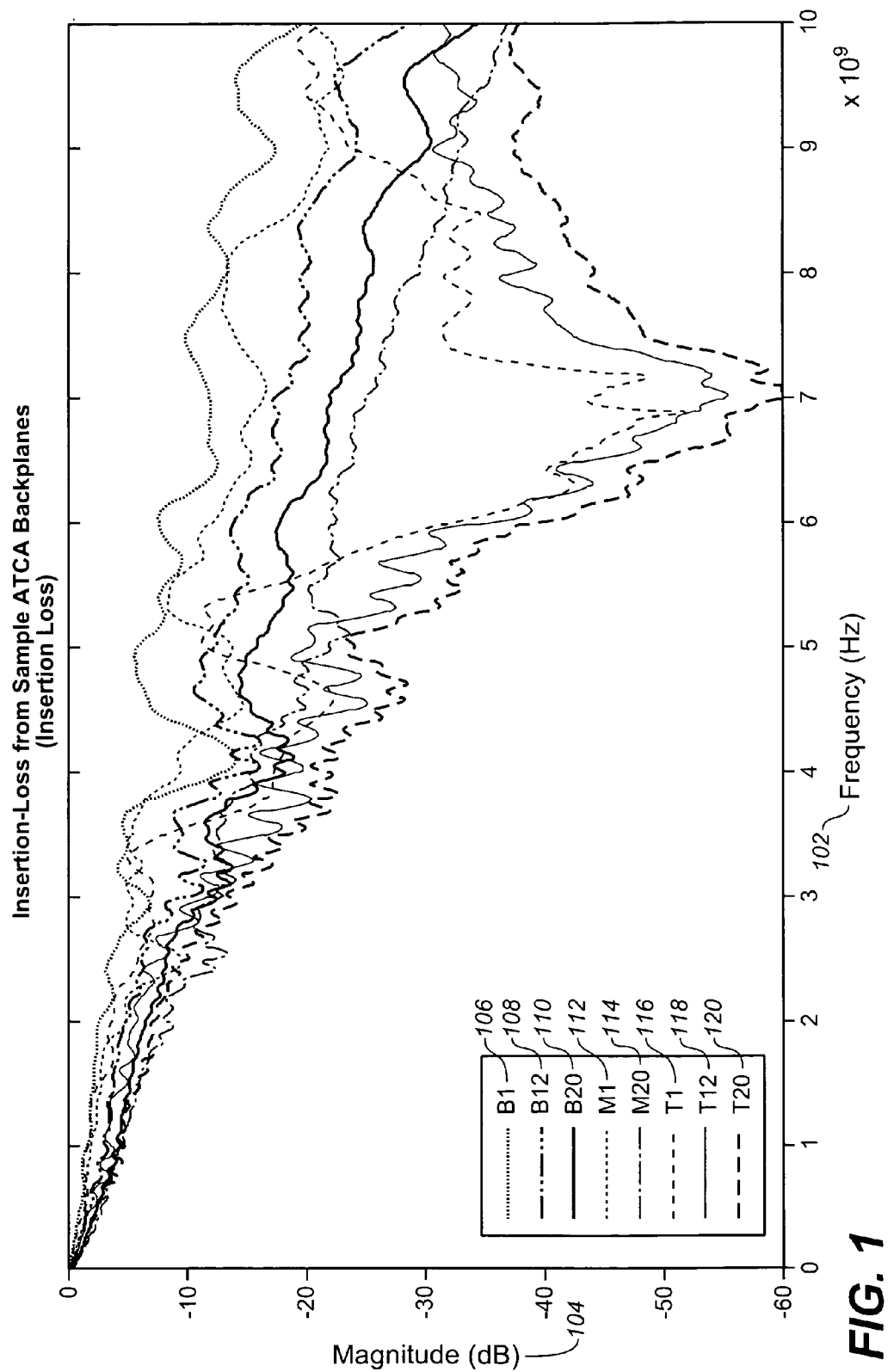
FIG. 1 is a graph depicting insertion loss from sample advanced telecommunications computing architecture (ATCA) backplanes in accordance with an illustrative embodiment.

With reference now to FIG. 1, a graph depicting insertion loss from sample advanced telecommunications computing architecture (ATCA) backplanes is depicted in accordance with an illustrative embodiment. The graph shows the measurement results of the insertion loss for the sample ATCA backplanes that are typical representations of commercial backplane channels. The graph shows insertion loss plots for several backplanes, with signal frequency in Gigahertz 102 depicted on the X-Axis and signal magnitude in decibels (dB) 104 depicted on the Y-Axis.

The plot line corresponding to line style 106 depicts the insertion loss plot for backplane B1.
The plot line corresponding to line style 108 depicts the insertion loss plot for backplane B12.
The plot line corresponding to line style 110 depicts the insertion loss plot for backplane B20.
The plot line corresponding to line style 112 depicts the insertion loss plot for backplane M1.
The plot line corresponding to line style 114 depicts the insertion loss plot for backplane M20.
The plot line corresponding to line style 116 depicts the insertion loss plot for backplane T1.
The plot line corresponding to line style 118 depicts the insertion loss plot for backplane T12.
The plot line corresponding to line style 120 depicts the insertion loss plot for backplane T20.

Figure 2:
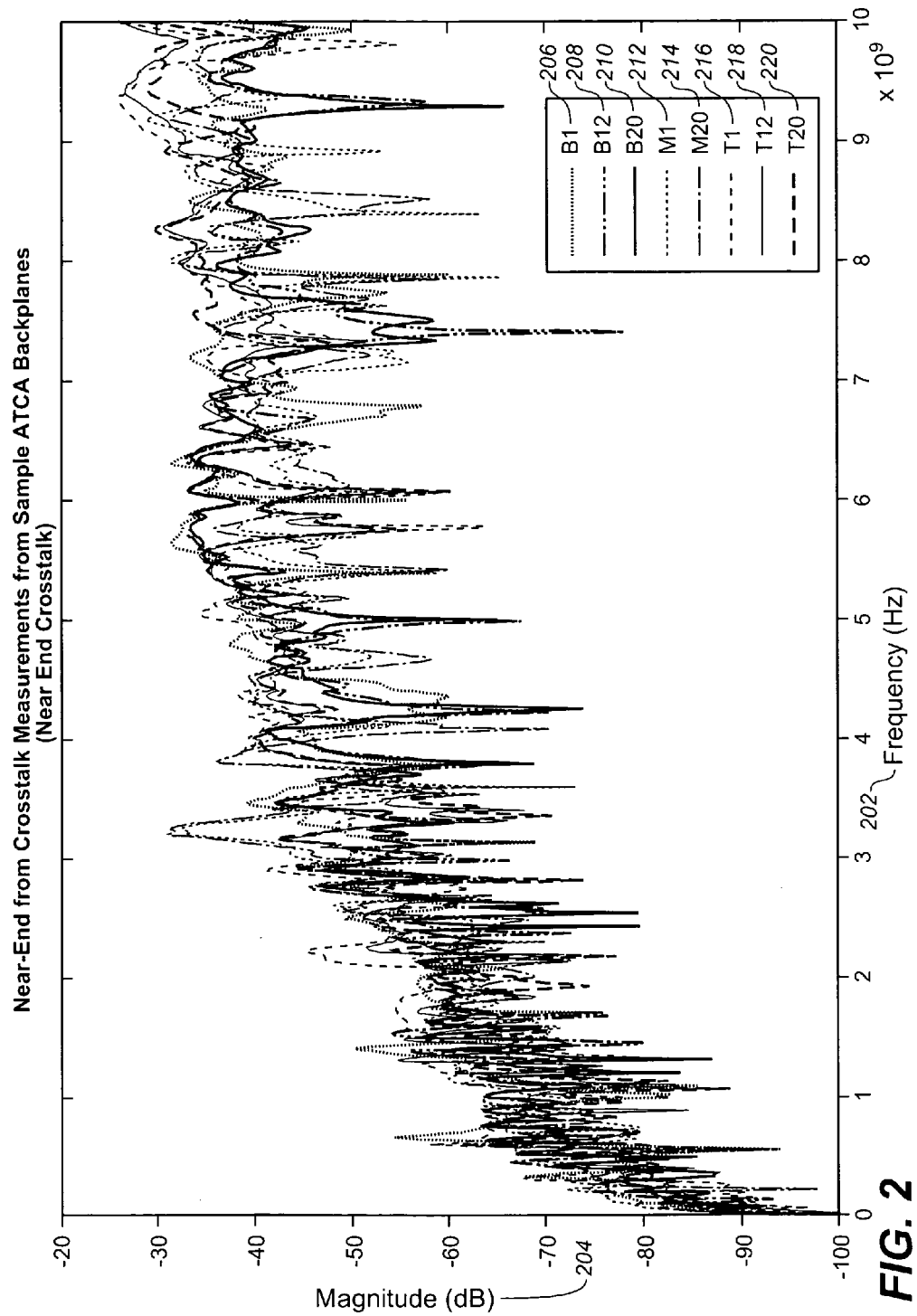
FIG. 2 is a graph depicting near-end crosstalk from sample ATCA backplanes in accordance with an illustrative embodiment.

With reference now to FIG. 2, a graph depicting near-end crosstalk from sample ATCA backplanes is depicted in accordance with an illustrative embodiment. The graph shows the measurement results of the near-end crosstalk for the sample ACTA backplanes that are typical representations of commercial backplane channels. Near-end crosstalk (NEXT) is an electromagnetic interference (EMI) introduced on wires or connectors by other wires or connectors that are close by, usually running in parallel with the wire or connector on which the near-end crosstalk is induced. The graph shows near-end crosstalk plots for several backplanes, with signal frequency in Gigahertz 202 depicted on the X-Axis and signal magnitude in decibels (dB) 204 depicted on the Y-Axis. The plot line corresponding to line style 206 depicts the near-end crosstalk plot for backplane B1. The plot line corresponding to line style 208 depicts the near-end crosstalk plot for backplane B12. The plot line corresponding to line style 210 depicts the near-end crosstalk plot for backplane B20. The plot line corresponding to line style 212 depicts the near-end crosstalk plot for backplane M1. The plot line corresponding to line style 214 depicts the near-end crosstalk plot for backplane M20. The plot line corresponding to line style 216 depicts the near-end crosstalk plot for backplane T1. The plot line corresponding to line style 218 depicts the near-end crosstalk plot for backplane T12. The plot line corresponding to line style 220 depicts the near-end crosstalk plot for backplane T20.

Similar to the insertion loss, crosstalk is frequency dependent. As illustrated in FIGS. 1 and 2, at 6 GHz and above, the crosstalk energy rises close to the signal energy, and worse for some channels, even dominates the signal energy at slightly higher frequencies.

In FIG. 1, the insertion losses for some typical backplane channels are displayed. The dielectric loss, skin effect and reflections in the channel cause these frequency dependent losses. For successful transceiver design, where good bit-error-rate (BER) rate of $10^{\wedge}(-15)$ or better is usually required, the insertion loss must be equalized to cancel the inter-symbol interference (ISI) for reliable signal detection.

Equalization schemes are usually either linear equalization, or decision feedback equalization. Linear equalization is usually analog in nature and works in continuous time without requiring clock information. Linear equalization performed in continuous time is called continuous-time linear equalization. Decision feedback equalization usually works in discrete time and is defined on a sampled data. Decision feedback equalization performed in discrete time is called discrete-time decision feedback equalization. Linear equalization schemes that work in discrete-time, and decision feedback equalization schemes that work in continuous time are also known in the art, but are not relevant to the illustrative embodiments.

Typically, only a linear equalizer or a decision feedback equalizer is used in a receiver. A hybrid equalization scheme combines the linear equalization and the decision feedback equalization. Hybrid equalization scheme implemented as a circuit in a receiver is called a hybrid receiver equalization circuit. Hybrid receiver equalization circuit consists of an adaptive analog filter as linear equalizer and an adaptive decision feedback equalizer (DFE). An adaptive filter is a filter whose coefficient, such as db gain, is not fixed and can be changed. An adaptive analog filter is a filter for analog signal that has such adaptive characteristics. Similarly, an adaptive equalizer is an equalizer whose coefficient, such as pole and zero locations, is not fixed and can be changed. An adaptive decision feedback equalizer is therefore a decision feedback equalizer with such adaptive characteristics.

Depending on the speed of transmission, each bit of data occupies a certain period of time. For example, in a 1 Gigabits per second ($10^9$ bits per second), a bit spans a nanosecond ($10^{-9}$ second). The time span of a bit is called a tap. Therefore, distance between bits can be measured in taps. As an example, 4-taps are bits that are four bits apart in transmission. Inter-symbol interference (ISI) is a phenomenon attributable to transmission channel limitations. During transmission, signal for a current bit that is being transmitted will be affected by the previous bit or bits that were transmitted through the same channel. Transmission of a bit through a channel is essentially a spike of voltage on the channel. Due to channel limitations, a spike cannot instantly rise from zero voltage when a bit is transmitted, nor instantly fall to zero voltage after the bit has been transmitted. Consequently, a decaying signal of a previously transmitted bit affects the signal of a later transmitted bit. This phenomenon is called inter-symbol interference.

The adaptive decision feedback equalizer is designed to cover the first few large inter-symbol interference (ISI) taps and the linear equalizer is designed to target the remaining long decaying taps that are out-of-reach of the adaptive decision feedback equalizer.

Illustrative embodiments recognize that crosstalk interferes with adaptive decision feedback equalizer operation. Illustrative embodiments further recognize that a major tradeoff of receiver equalization architecture is between a linear equalizer that is low power but enhances crosstalk, and a higher power adaptive decision feedback equalizer that does not enhance crosstalk.

Signal coming into a receiver contains noise and crosstalk in addition to the valid signal due to limitations of the transmission channel and other reasons. Noise and crosstalk must be filtered out using filters. An order of a filter is the –db/dec of noise reduction the filter can perform. Order of a filter is indicative of the quality of the filter. An order 1 filter reduces noise in the range of –20 db/dec, and order 2 filter reduces noise in the range of –40 db/dec, and an order 3 filter reduces noise in the range of –60 db/dec. The higher the order of the filter, the more sensitive the filter is to the noise, and accordingly less stable and technologically more complex to build. A steep high-order filter is a filter of high-order with better than –40 db/dec reduction in noise and provides better distinction between the valid signal and the noise. A pass band filter is a filter designed to pass a band of frequencies in the frequency spectrum and stop the remaining frequencies in the frequency spectrum. Therefore, a steep high-order pass band filter is a filter of high-order with excellent signal-to-noise distinction characteristics for a frequency band within which the valid signal lies.

A frequency boundary exists between the band of passed frequencies and the stopped frequencies. For frequencies in this boundary, the filter characteristics transition from passing behavior to blocking behavior and vice-versa. Magnitude change of the signal frequencies in this boundary is called "roll-off." Roll-off is an indicator of how quickly a filter changes from pass band characteristics to stop band characteristics, and how narrow the transition boundary of frequencies is for that filter.

Presently, due to the stability and implementation complexities of high-order filters, low order filters are prevalently used for separating signal from noise. As a side effect of using low order filters, the transition band becomes wide and the roll-off is not quick. To address the problem of wide transition band present implementations using low order filters also use adaptive bandwidth controllers to manage the spread of the transition band. Adaptive bandwidth controllers help in making analog filters work with low order filters.

In the illustrative embodiments, the amount of crosstalk energy is mitigated by the steep high-order pass band roll-off of the linear equalizer. As a result, adaptive bandwidth controller is not required, and the amount of coupling between the hybrid linear equalizer and adaptive decision feedback equalizer adaptation is minimized. Different from conventional receiver equalization schemes, another feature of the illustrative embodiments is that the low-frequency content of the signal is part of the equalization targets. Conventional equalization schemes are essentially low-pass in nature with the band of low frequencies being rather wide. Such schemes pass much of the lower part of frequency spectrum and block the higher band of the frequency spectrum. In contrast, the hybrid equalization scheme of the illustrative embodiments acts as band-pass. In so acting, the passed band of frequencies is bound on the low end as well as the high end of the frequency spectrum, and the equalization becomes band-pass in nature. The passed band of frequencies is called the equalization target.

A crosstalk is a consideration that discourages the use of both the linear and decision feedback equalizers in the receiver. Excessive crosstalk interferes with decision feedback equalizer (DFE) operation. Prior art laid the foundation of combined linear and decision feedback equalizer (DFE) equalization by inserting an adaptive bandwidth controller between the linear equalizer and decision feedback equalizer (DFE) to mitigate the amount of crosstalk populated to decision feedback equalizer (DFE). In the illustrative embodiments described here, the crosstalk is controlled by the high-order (>40 dB) high-frequency roll-off of the receiver linear equalizer. No adaptive bandwidth controller is necessary in the illustrative embodiments. Backed by the high performance receiver linear equalizer, the writhing coupling between the bandwidth controller, the linear equalizer adaptation and the decision feedback equalizer (DFE) adaptation is eliminated.

The linear equalizer consists of two sections—a direct current (DC) and low frequency blocking alternating current (AC) coupling section and an analog filter section with high-order high frequency roll-off. A direct current (DC) and low frequency blocking alternating current (AC) coupling section is a part of the circuit that blocks low frequencies and passes high frequencies. For example, one of ordinary skill in the art knows that a capacitor blocks low frequencies including direct current (DC) which has a frequency of zero. In this respect, a capacitor acts as a high pass filter and could theoretically be used for the alternating current (AC) coupling section. The capacitor filter is provided here only as an example for explaining the concept of an alternating current (AC) coupling. Actual implementation of alternating current (AC) coupling section involves more than just a capacitor.

In a resistive-capacitive circuit (an RC circuit), the "RC time constant" of the circuit determines the frequency cut off-of the circuit. A frequency cut off-of a resistive-capacitive (RC) circuit is the frequency at which the resistive-capacitive (RC) circuit, acting as a high-pass filter stops blocking and starts passing the frequencies in a signal. This frequency cut off is called the corner frequency.

In the illustrative embodiments, a method for adjusting the alternating current (AC) coupling corner frequency 'on the fly' is provided for signals where the low frequency content can be part of the equalization targets. When both adjustable low frequency and high frequency blocking are in effect, the equalization offered by the current invention is band-pass, compared with the conventional low-pass receiver equalization schemes.

In the illustrative embodiments, the combined receiver linear equalizers can be made band-pass. In addition to the high frequency roll-off, dynamic low frequency rejection can be implemented and be part of the overall equalization scheme. Prior art uses a fixed AC coupling corner to reject the DC and low frequency contents of the data. Illustrative embodiments recognize that this type of fixed low frequency rejection cannot be part of the equalization scheme because of the physical implementation difficulty to adjust the AC coupling corner. Prior art in receiver equalization is low-pass in nature. In the illustrative embodiments, implementation method that can be used to adjust the AC coupling corner frequency 'on the fly' is provided and the resulted overall equalization scheme can be band-pass.

Standard implementation of a linear equalization scheme includes an implementation of an adaptation algorithm for linear equalization. Similarly, a standard implementation of a decision feedback equalization scheme includes an implementation of an adaptation algorithm for decision feedback equalization. A joint adaptation algorithm is the combination of the linear equalization adaptation algorithm and the decision feedback equalization adaptation algorithm for use in a hybrid equalization scheme.

A typical decision feedback equalizer (DFE) is discrete in nature, and its performance is truncated by the quantization error. The value of an extra decision feedback equalizer (DFE) tap diminishes once the tap value approaches the quantization step-size. An implementation-wise expensive longer tap decision feedback equalizer (DFE) does not necessarily produce better performance than a shorter-tap decision feedback equalizer (DFE) beyond certain points.

The band-pass filter in the illustrative embodiments is continuous in nature, and can provide infinitive resolution to remove those small tap inter-symbol interference (ISI) that are difficult to handle by the decision feedback equalizer (DFE) due to the limited resolution of the decision feedback equalizer (DFE) taps. In the hybrid scheme of the illustrative embodiments, the decision feedback equalizer (DFE) is targeted to handle large inter-symbol interference (ISI) taps and the band-pass filter is targeted to handle the long small inter-symbol interference (ISI) taps. As a result, the illustrative embodiments achieve better overall performance than a typical long-tap decision feedback equalizer (DFE) with a fraction of the implementation cost.

The illustrative embodiments provide a joint adaptation algorithm that uses the estimate pulse response for both decision feedback equalizer (DFE) and continuous-time band-pass filter adaptations. The variable gain amplifier (VGA), the band-pass filter, the decision feedback equalizer (DFE) and the adjustable reference level ($h_0$) main-cursor target adaptation are coordinated and function in an automatic way.

Illustrative embodiments show an implementation of a joint adaptation algorithm for the high-order linear equalizer backed hybrid receiver equalizers. A high-order linear equalizer backed hybrid receiver equalizer is a hybrid receiver equalizer that utilizes a high-order linear equalizer in conjunction with a decision feedback equalizer for the hybrid equalization scheme to work as described. Extensive system analysis has been done to verify the feedback loop behavior, study many backplane channels, and define parameters, such as the linear and decision feedback equalization tap size and tap range.

Illustrative embodiments employ a blending of continuous-time linear equalization and discrete-time decision feedback equalization simultaneously in the receiver that offers a hybrid strategy for inter-symbol interference (ISI) cancellation in the receiver. Illustrative embodiments use discrete-time single-tap or multi-tap decision feedback equalizer (DFE) targeting first few large inter-symbol interference (ISI) taps and a high-order continuous-time linear equalizer targeting the long decaying tail. Discrete-time single-tap or multi-tap decision feedback equalizer (DFE) is a decision feedback equalizer that works in discrete time, that is, at the time slice of the currently sampled bit, and utilizes feedback from single or multiple past bits or taps for the equalization decision. Thus, the illustrative embodiments provide effective crosstalk suppression, yet maintain signal bandwidth and linearity.

Illustrative embodiments implement a wide linear input range variable gain amplifier in the receiver, in addition to the variable slicer reference value ($h_0$) gain adaptation. The illustrative embodiments accept a wide range of the transmitter (TX) swing and keep the decision feedback equalizer (DFE) operating in the desired range. The signal amplitude adaptation can be done readily within the receiver of the illustrative embodiments, keeping the back-channel bandwidth and transmitter adaptation to a minimum.

For the equalization in the illustrative embodiments, a hybrid receiver equalizes signals that have tap-range beyond what can be covered by a presently available decision feedback equalizer (DFE). The equalization adaptation to track the environmental change is done in the receiver (RX) of the illustrative embodiments. Therefore, the need for transmitter (TX) adaptation through back-channel is minimal in the illustrative embodiments.

Furthermore, the illustrative embodiments provide simultaneous forward and back-channel transmission on the same physical link with both direction transmitters (TX) using differential signaling. The linear equalizer and the decision feedback equalizer (DFE) in the illustrative embodiments are backed by the receiver that contains the variable gain amplifier (VGA). Variable gain amplifier (VGA) is an amplifier whose gain can be adjusted. A variable gain amplifier (VGA) is used for automatic gain control function (AGC). Therefore, the bandwidth requirement for the back-channel to adjust the transmitter (TX) parameters is small.

In the illustrative embodiments, the back-channel signal occupies a lower signal-band, typically only up to a few kHz, and is scalable with forward channel transmission rate. The forward channel occupies a higher frequency band that are typically more than a few MHz. In the illustrative embodiments, analog filters are used to isolate and retrieve the forward and back channel signals. A hybrid receiver signal amplitude adaptation in the illustrative embodiments employs a variable gain amplifier (VGA) and a slicer with adjustable reference level ($h_0$). The variable gain amplifier (VGA) provides coarse gain adjustment and the adjustable reference level ($h_0$) provides fine gain adjustment. Gain adjustment is the adjustment of the amplification performed by an amplifier. Coarse gain adjustment is the gain adjustment in large steps or increments. Fine gain adjustment is the gain adjustment in small increments. As a result, the hybrid receiver of the illustrative embodiments can have large dynamic range that both very small and very large signals can be seen and equalized effectively.

Furthermore, the illustrative embodiments provide a scheme for simultaneous forward and back-channel transmission on the same physical link with both direction transmitted using differential signaling. The forward-channel occupies the higher signal frequency band, and the back-channel signal occupies the lower signal frequency band. Analog filters are used to isolate and retrieve the forward and back-channel signals. The overlapping use of the frequency band by both the forward and back-channels, and the associated complications of crosstalk leakage, performance cutback, and trade-off as characteristic of the second currently used technique, is thus avoided.

Illustrative embodiments describe dual-speed simultaneous transmission scheme on the same physical link. Illustrative embodiments further describe simultaneous differential signaling forward and back-channel transmission for multi-Gbps transceivers.

Figure 3:
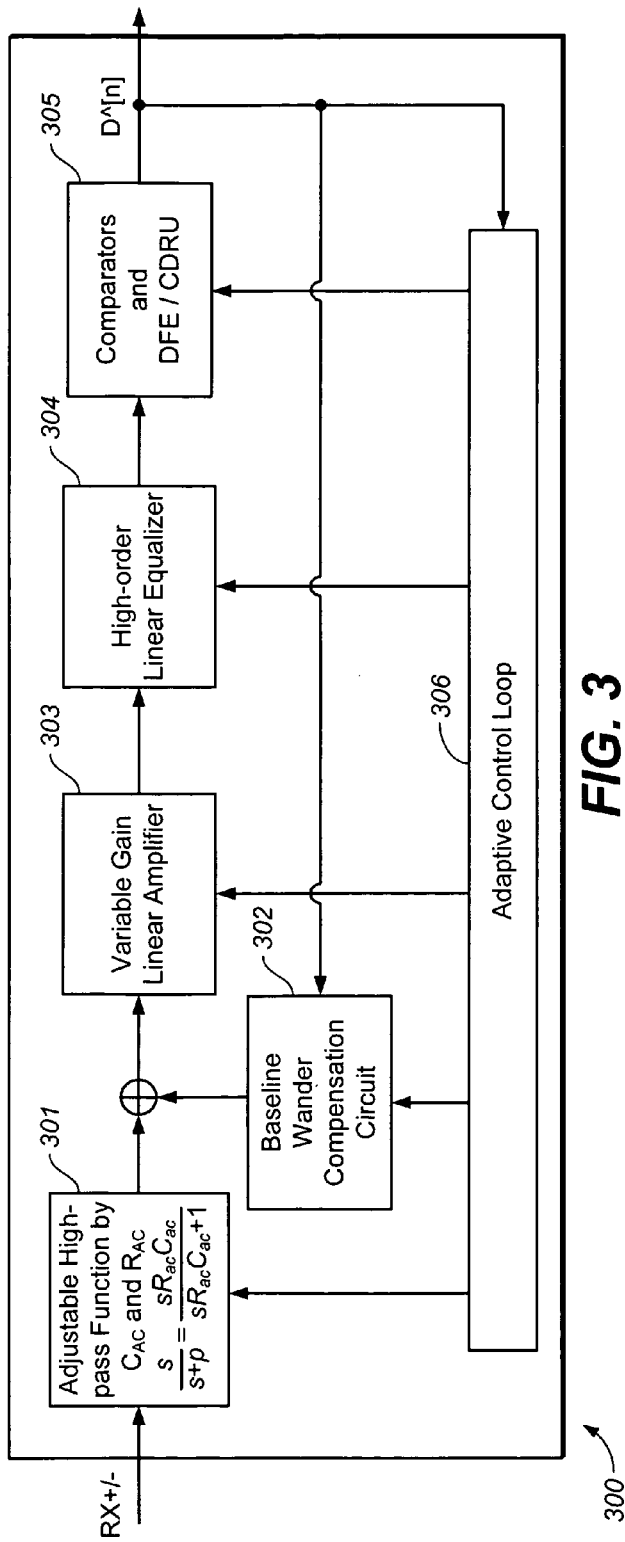
FIG. 3 is a block diagram of a high-order band-pass linear equalizer backed hybrid receiver equalization in accordance with an illustrative embodiment.

With reference now to FIG. 3, a block diagram of a high-order band-pass linear equalizer backed hybrid receiver equalization 300 is depicted in accordance with an illustrative embodiment. Component 301 implements an adjustable high-pass function. Component 302 provides baseline wander compensation. Combined output of components 301 and 302 serves as the input to component 303, which is a variable gain amplifier. Variable gain amplifier 303 connects to component 304, which is the high-order linear equalizer. Component 305 is one or more comparators including decision feedback equalizer (DFE) and clock and data recovery unit (CDRU). An adaptive control loop 306 connects components 301, 302, 303, 304 and 305

Figure 4:
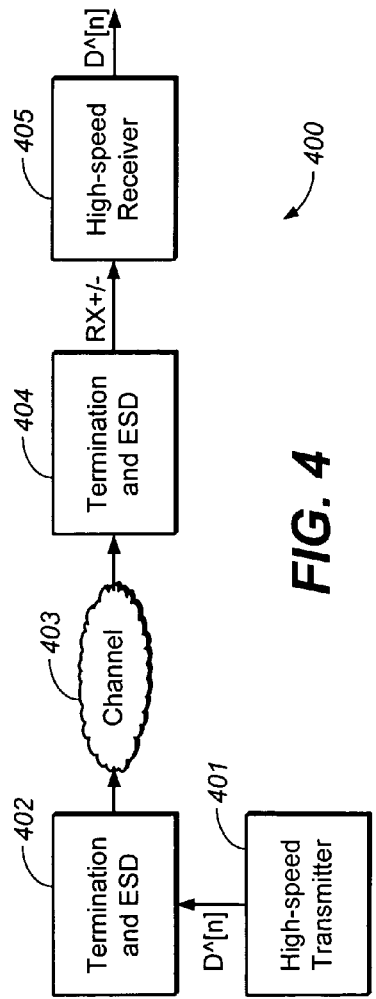
FIG. 4 is a block diagram of a system incorporating the high-speed receiver in accordance with an illustrative embodiment.

With reference now to FIG. 4, a block diagram of a system 400 incorporating the high-speed receiver is depicted in accordance with an illustrative embodiment. High-speed transmitter 401 provides input to component 402, which provides termination and electrostatic discharge protection (ESD). Termination indicates a termination resistor for impedance matching for minimizing reflection and optimizing return loss. Electrostatic discharge (ESD) is the sudden and momentary electric current that flows when an excess of electric charge, stored on an electrically insulated object, finds a path to an object at a different electrical potential, such as electrical ground. The term is usually used in the electronics and other industries to describe momentary unwanted currents that may cause damage to electronic equipment. Electrostatic discharge protection is a circuit for protecting against electrostatic discharges.

Component 402 provides input through channel 403 to component 404, which is a second component providing termination and electrostatic discharge (ESD). Component 404 provides input to high-speed receiver 405.

Figure 5:
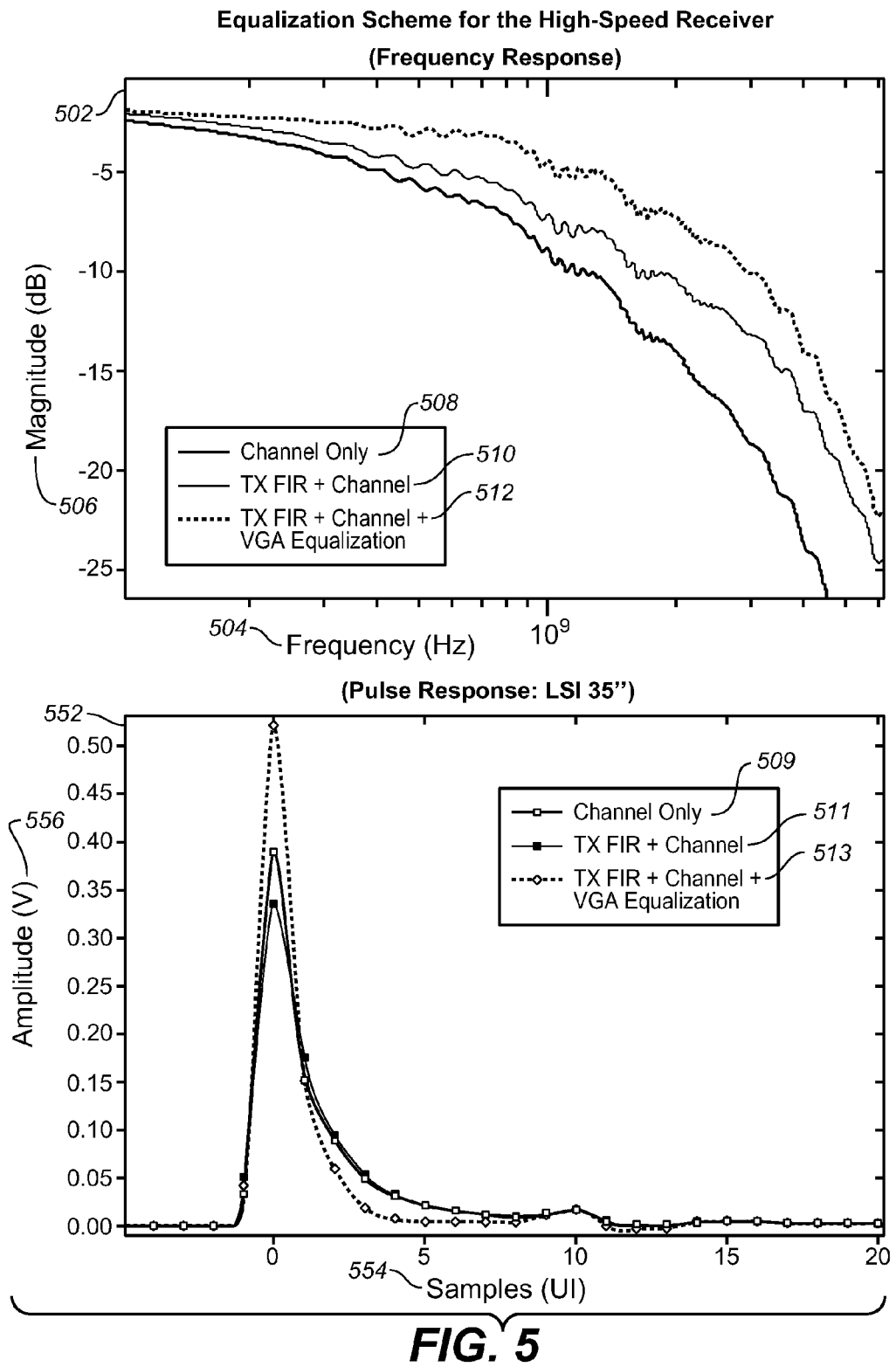
FIG. 5 is two response graphs in accordance with an illustrative embodiment.

With reference now to FIG. 5, two response graphs are depicted in accordance with an illustrative embodiment. Graph 502 depicts the frequency response of the equalization scheme for the high-speed receiver. The graph shows signal frequency in Gigahertz 504 depicted on the X-Axis and signal magnitude in decibels (dB) 506 depicted on the Y-Axis. The plot line corresponding to line style 508 depicts the frequency response plot for channel only. The plot line corresponding to line style 510 depicts the frequency response plot for TX FIR plus the channel. The plot line corresponding to line style 512 depicts the frequency response plot for TX FIR plus the channel and variable gain amplifier (VGA) equalization.

Graph 552 shows the pulse response of the equalization scheme for the high-speed receiver. The graph shows signal samples in unit intervals (UI) 554 depicted on the X-Axis and signal amplitude in Volts (V) 556 depicted on the Y-Axis. The plot line corresponding to line style 509 depicts the pulse response plot for channel only. The plot line corresponding to line style 511 depicts the pulse response plot for TX FIR plus the channel. The plot line corresponding to line style 513 depicts the pulse response plot for TX FIR plus the channel and variable gain amplifier (VGA) equalization.

Figure 6:
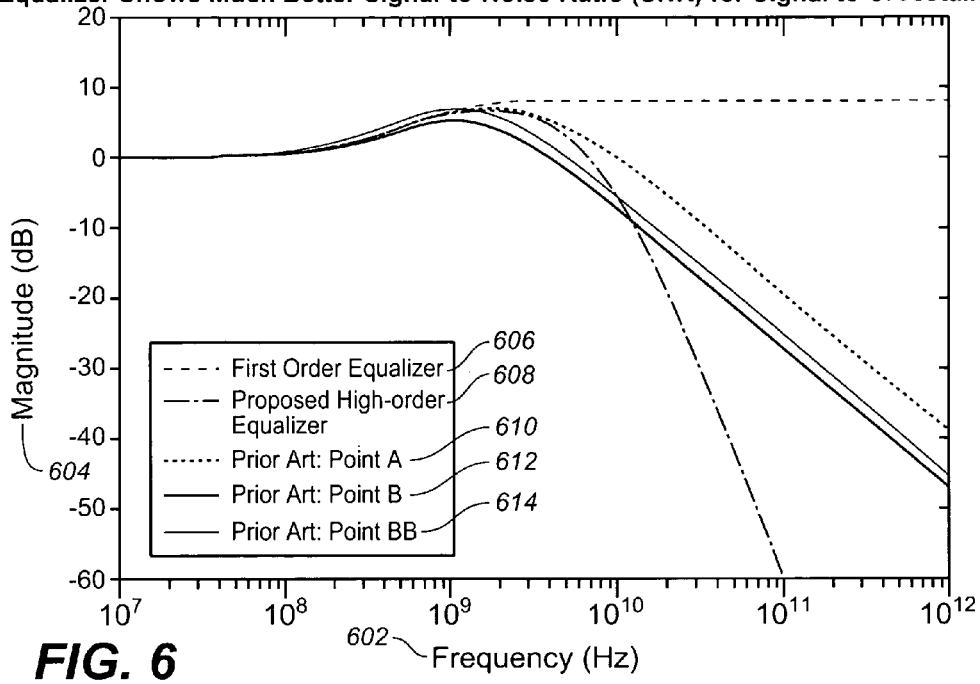
FIG. 6 is a comparative graph in accordance with an illustrative embodiment.

With reference now to FIG. 6, a comparative graph is depicted in accordance with an illustrative embodiment. The graph in FIG. 6 compares the frequency-magnitude plots of a high-order linear equalizer according to an illustrative embodiment and those of the prior art. The plot identified by markings corresponding to the label "proposed high-order equalizer" tracks the response of the high-order linear equalizer according to the illustrative embodiment, which shows combined linear equalizer and bandwidth control. This plot shows that the high-order linear equalizer according to the illustrative embodiment shows much better signal-to-noise ratio (SNR) for signal to crosstalk.

The graph shows signal frequency 602 depicted on the X-Axis and signal magnitude in decibels (dB) 604 depicted on the Y-Axis. The plot line corresponding to line style 606 depicts the signal-to-noise ratio plot for a first order equalizer. The plot line corresponding to line style 608 depicts the signal-to-noise ratio plot for a high order equalizer according to the illustrative embodiments. The plot line corresponding to line style 610 depicts the signal-to-noise ratio plot for a currently used technique at point A. The plot line corresponding to line style 612 depicts the signal-to-noise ratio plot for a currently used technique at point B. The plot line corresponding to line style 614 depicts the signal-to-noise ratio plot for a currently used technique at point BB.

Figure 7:
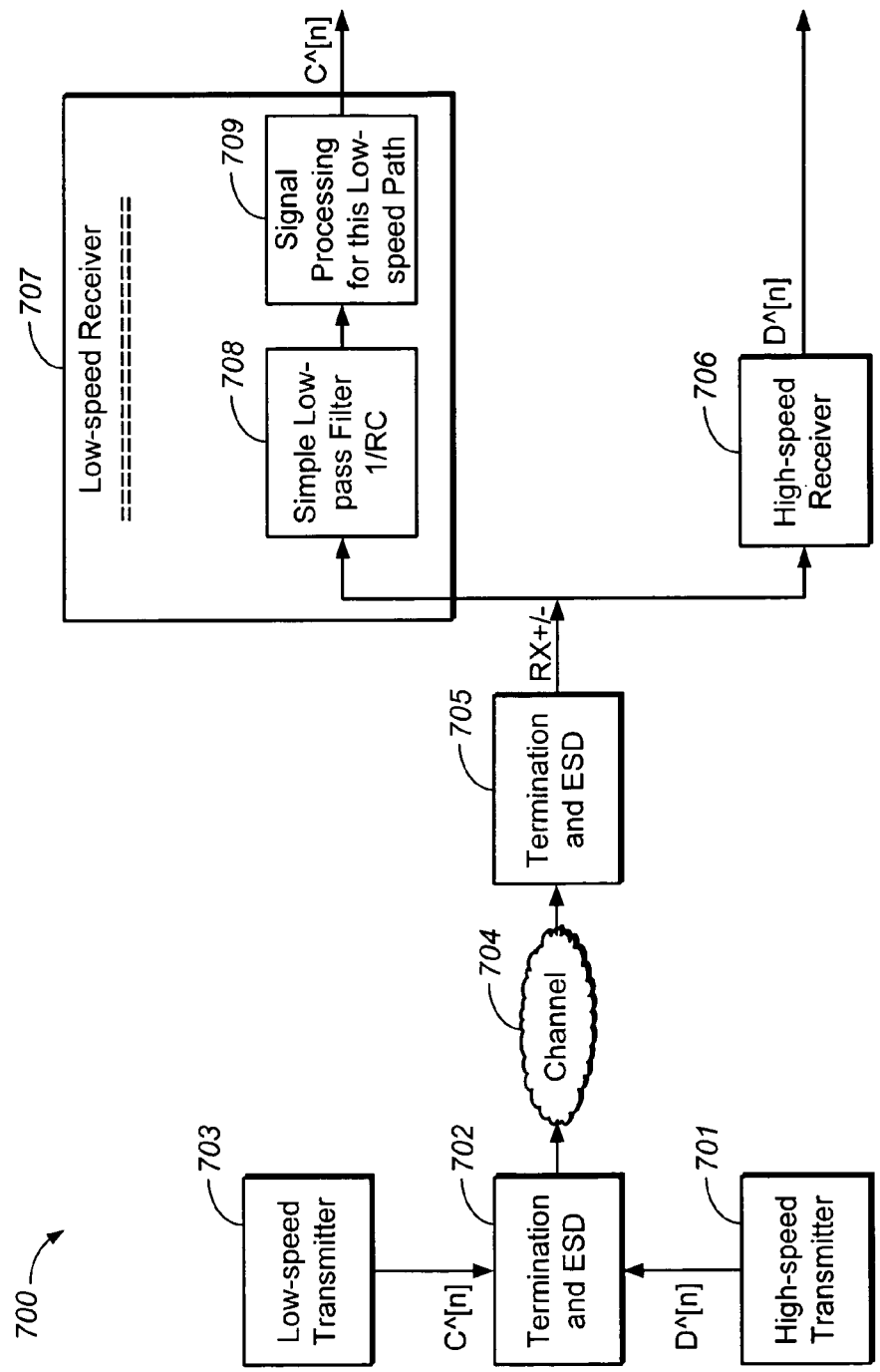
FIG. 7 is a block diagram depicting a system employing two simultaneous forward transmissions in accordance with an illustrative embodiment.

With reference now to FIG. 7, a block diagram depicting a system employing two simultaneous forward transmissions is depicted in accordance with an illustrative embodiment. The system of FIG. 7 uses two simultaneous forward transmissions where one transmission is high-speed for multi-Gbps data, and the other is low-speed of speed less than 1 MegaHertz (MHz) for low-speed data or controls. Both transmissions use differential signaling and share the same physical link.

High-speed transmitter 701 provides input to component 702, which provides termination and electrostatic discharge (ESD). Low-speed transmitter 703 also provides simultaneous input to termination and electrostatic discharge (ESD) component 702. Channel 704 receives input from termination and electrostatic discharge (ESD) component 702 and provides input to termination and electrostatic discharge (ESD) component 705. Components 702, 704 and 705 together form the physical link.

The output of component 705 is provided as simultaneous input to a high-speed receiver 706, and a low-speed receiver 707. Low-speed receiver 707 includes simple low-pass filter 708, and signal processing component 709 that processes the signal for the low-speed path.

Figure 8:
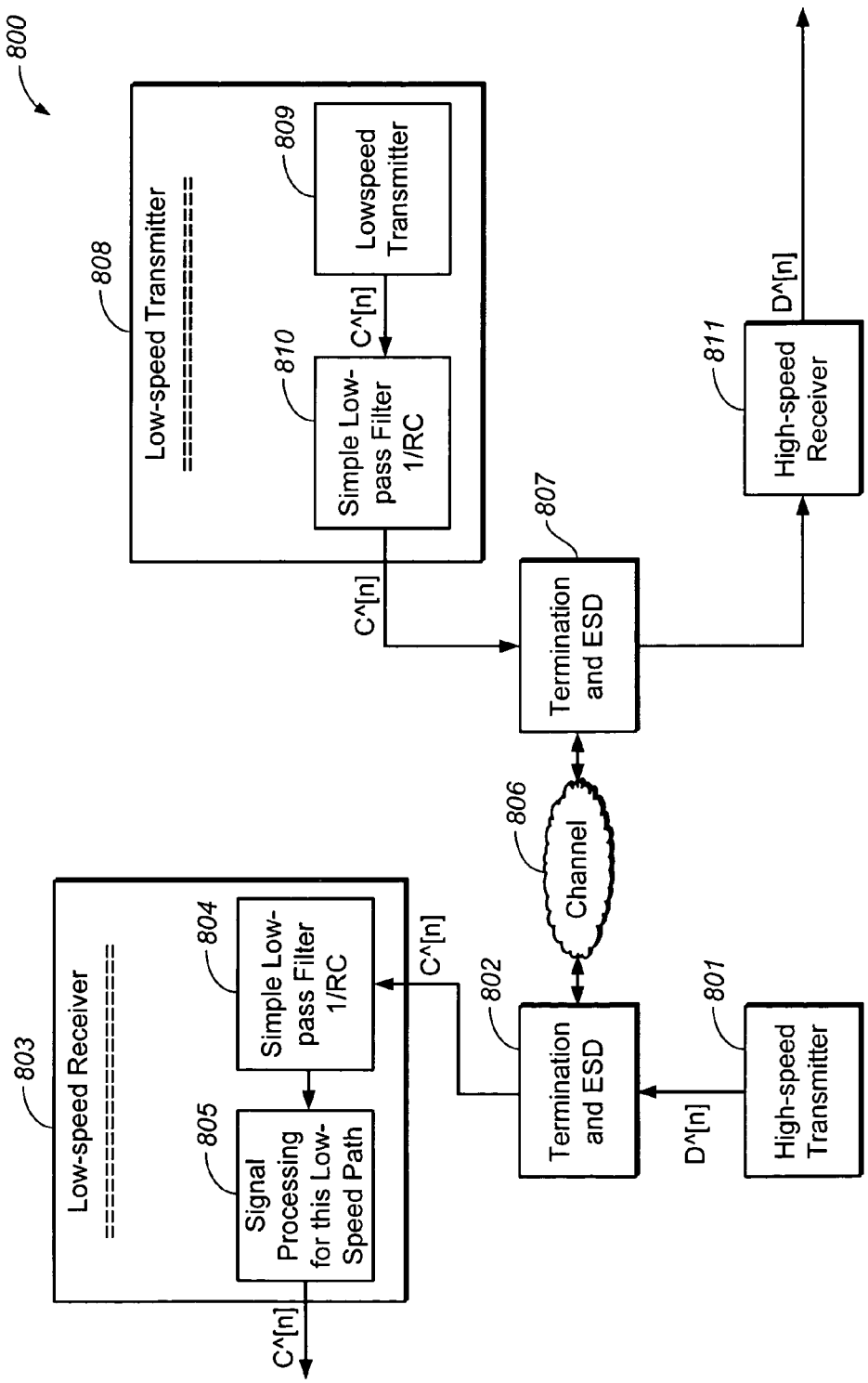
FIG. 8 is a block diagram of a system employing simultaneous differential-signaling forward and back-channel transmissions for multi-Gbps transceivers in accordance with an illustrative embodiment.

With respect now to FIG. 8, a block diagram of a system employing simultaneous differential signaling forward and back-channel transmissions for multi-Gbps transceivers is depicted in accordance with an illustrative embodiment. Differential signaling is a method of transmitting information over pairs of wires as opposed to single-ended signaling, which transmits information over single wires. A back-channel is typically a low-speed, or less-than-optimal, transmission channel in the opposite direction to the main or forward channel.

In the system depicted in FIG. 8, the forward transmission is high-speed multi-Gbps transmission and the back-channel transmission is the low-speed transmission of less than 1 MHz for transmitter (TX) controls. Both transmissions use differential signaling and share the same physical link.

High-speed transmitter 801 connects to component 802 providing termination and electrostatic discharge (ESD). Low-speed receiver 803 includes simple low-pass filter 804, and signal processing component 805 that processes the signal for the low-speed path. Termination and electrostatic discharge (ESD) component 802 connects to simple low-pass filter 804.

Termination and electrostatic discharge (ESD) component 802, channel 806, and termination and electrostatic discharge (ESD) component 807 form the physical link. This physical link is shared by the forward and back-channel transmissions.

Low-speed transmitter 808 includes low-speed transmitter component 809 and simple low-pass filter 810. Simple low-pass filter 810 connects to termination and electrostatic discharge (ESD) component 807. Termination and electrostatic discharge (ESD) component 807 connects to high-speed receiver 811.

Figures 9, 13, 14, 15:
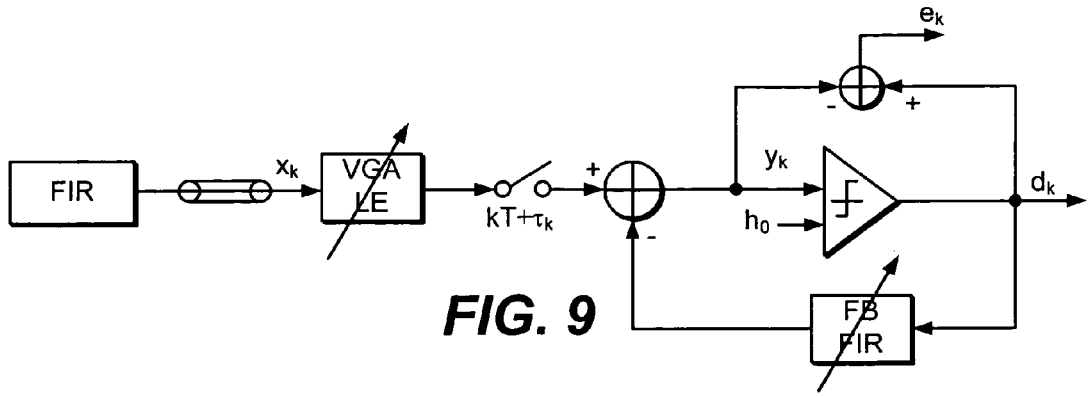
FIG. 9 is a circuit diagram of an exemplary variable gain amplifier (VGA) linear equalizer in accordance with an illustrative embodiment.
FIG. 13 is a table showing the difference in signal-to-noise ratio (SNR) with and without the linear equalizer in accordance with an illustrative embodiment.
FIG. 14 is a table of equalizer gain vector in accordance with an illustrative embodiment.
FIG. 15 is a table of error signal values in accordance with an illustrative embodiment.

With reference now to FIG. 9, a circuit diagram of an exemplary variable gain amplifier (VGA) and linear equalizer is depicted in accordance with an illustrative embodiment. A linear equalizer is included in the variable gain amplifier (VGA) stage. The goal of this equalizer is to provide low-frequency boost. Including the linear equalizer in the variable gain amplifier (VGA) stage in this manner can help cancel loss due to skin effect, which can be dominant at lower frequencies. Furthermore, the concern of crosstalk enhancement that accompanies the use of a linear equalizer is not nearly as prevalent at lower frequencies as it is at the higher frequencies. The algorithm and calculations related to FIG. 9 are as follows:

In the variable gain amplifier (VGA) linear filter structure, the filter transfer function is $$(1+k*\Sigma_n(s/(s+p_1)))*P_{p1}/(s+P_{p1})*P_{p2}/(s+P_{p2})$$

$p_{p1}$ and $p_{p2}$ parasitic poles with values of $p_{p1}$=6.5 GHz*2π, $p_{p1}$=10 GHz*2π.

$p_1$ is a pole with value of $p_1$=300 MHz*2π.

k is roughly equal to 0.2.

n has 6 settings, n=0,1,2,3,4,5, to provide different boost amplitudes about 0 dB, 1 dB, 2 dB, 3 dB, 4 dB and 5 dB respectively. When n=0 means no equalization, i.e., variable gain amplifier (VGA) equalization is off. When n=5, it provides the maximum boost, roughly 5 dB.

Figure 10:
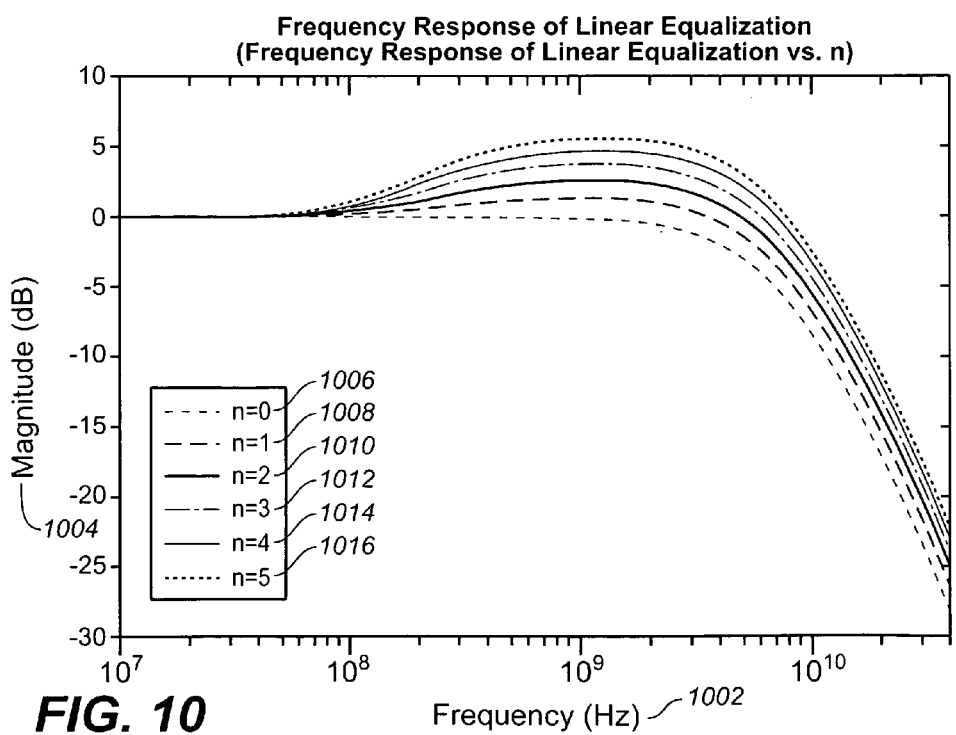
FIG. 10 is a graph of frequency response of linear equalization in accordance with an illustrative embodiment.

The frequency response of the linear filter is shown in FIG. 10.

For the variable gain amplifier (VGA) gain and adjustable reference level $h_0$ adaptation loops, variable gain amplifier (VGA) gain has seven settings: 2 dB, 0 dB, −2 dB, −4 dB, −6 dB, −8 dB, and −10 dB. An exemplary implementation of the illustrative embodiment has the seven settings as shown. The number of settings and specific values of such settings are implementation dependent. One of ordinary skill in the art will be able to create many groups of more or fewer settings to fit a particular implementation.

$h_0$ has 64 settings, linearly spaced from 60 mv to 200 mv.

Let $\bar{\gamma}$ be the vector of the 64 possible gain values. Also, let $i_k$ represent the index selecting the gain value at time k, where $i_k \in \{0,1,2,\ldots,63\}$. Therefore, the gain value at time k is $\gamma[i_k]$.

Let $\bar{\lambda}$ be the vector of the 6 possible variable gain amplifier (VGA) values. Also, let $j_k$ represent the index selecting the variable gain amplifier (VGA) value at time k, where $j_k \in \{0,1,2,3,4,5,6\}$. Therefore, the variable gain amplifier (VGA) value at time k is $\lambda[j_k]$.

This gain value is used to adjust the target level ($h_0 = \gamma[i_k]$*ideal) and to scale the ideal receive value when calculating the error signal $e_K$ as follows:

$$e_k = \text{sign}(d_k*(\gamma[i_k]*\text{ideal})-y_k)$$

where $y_k$ is the signal at the input to the slicer at time k and $d_k$ is the estimate of the data at time k at the output of the slicer. $e_k \in \{+1, -1\}$, and $d_k \in \{+1, -1\}$. In this equation, "sign" stands for a positive or a negative sign before the parenthesis and indicates the sign of the signal.

In order to adapt the gain value, a counter $\eta_k$ adjusts every 4T as follows $$\eta_k = \eta_{k-4} - \Delta\eta_k$$

where $$\Delta\eta_k = \text{sgn}((e_k*d_k)+(e_{k-1}*d_{k-1})+(e_{k-2}*d_{k-2})+(e_{k-3}*d_{k-3})).$$

$k \in \{0,4,8\ldots\}$, and $\Delta\eta_k \in \{-1,0,1\}$.

Using this counter, the index of the gain vector, and consequently, the gain, is updated as follows:

```
if (η_k >= μ_g)
    i_k = min(i_{k-4} + 1,63)
    if (i_k > 25 and j_k < 6 )
        j_k = min(j_{k-4} + 1,6)
        i_k = 15
    η_k = 0
else if (η_k <=(− μ_g))
    i_k = max(i_{k-4} − 1,0)
    η_k = 0
else
    i_k = i_{k-4}
    j_k = j_{k-4}
end
```

$\mu_g$ controls the bandwidth of the gain loop and will have 8 possible values $\{2^9, 2^{10}, 2^{11}, 2^{12}, 2^{13}, 2^{14}, 2^{15}, 2^{16}\}$.

Default variable gain amplifier (VGA) value is 2 dB, and default $h_0$=60 mv, i.e., $$i_0=0$$

$$j_0=0$$

With reference now to FIG. 10, a graph of frequency response of linear equalization is depicted in accordance with an illustrative embodiment. The graph shows the frequency response of the linear filter of FIG. 9, at the six different boost amplitudes. From this graph, it is evident that the linear equalizer provides mid-band frequency boost to the received signal. At the receiver, 4-tap decision feedback equalizer (DFE) is set to remove the first four tap post-cursor inter-symbol interference (ISI). Cursor refers to the current bit, and post-cursor refers to the bit before the current bit. A certain number of taps post-cursor refers to that number of bits before the current bit. A 4-tap decision feedback equalizer is a decision feedback equalizer that uses feedback from up to 4 bits before the current bit for equalization decision. The goal of the linear equalizer is to remove the long decaying inter-symbol interference (ISI) tail after the fourth tap. Since the pole is set at 300 MHz, the linear equalizer is able to remove inter-symbol interference (ISI) tail up to the tenth tap.

The graph shows signal frequency 1002 depicted on the X-Axis and signal magnitude in decibels (dB) 1004 depicted on the Y-Axis. The plot line corresponding to line style 1006 depicts the frequency response plot for linear equalization according to an illustrative embodiment at boost level 0. The plot line corresponding to line style 1008 depicts the frequency response plot for linear equalization according to an illustrative embodiment at boost level 1. The plot line corresponding to line style 1010 depicts the frequency response plot for linear equalization according to an illustrative embodiment at boost level 2. The plot line corresponding to line style 1012 depicts the frequency response plot for linear equalization according to an illustrative embodiment at boost level 3. The plot line corresponding to line style 1014 depicts the frequency response plot for linear equalization according to an illustrative embodiment at boost level 4. The plot line corresponding to line style 1016 depicts the frequency response plot for linear equalization according to an illustrative embodiment at boost level 5.

Figure 11:
FIG. 11 is a table of corresponding values of variable gain amplifier (VGA) gain and $h_0$ voltage in accordance with an illustrative embodiment.

With reference now to FIG. 11, a table of corresponding values of variable gain amplifier (VGA) gain and $h_0$ voltage is depicted in accordance with an illustrative embodiment. The table shows three columns, one each for an index value, an $h_0$ voltage value, and the corresponding variable gain amplifier (VGA) gain value. $h_0$ voltage value represents the target value for voltage level representing the current bit.

Figure 12:
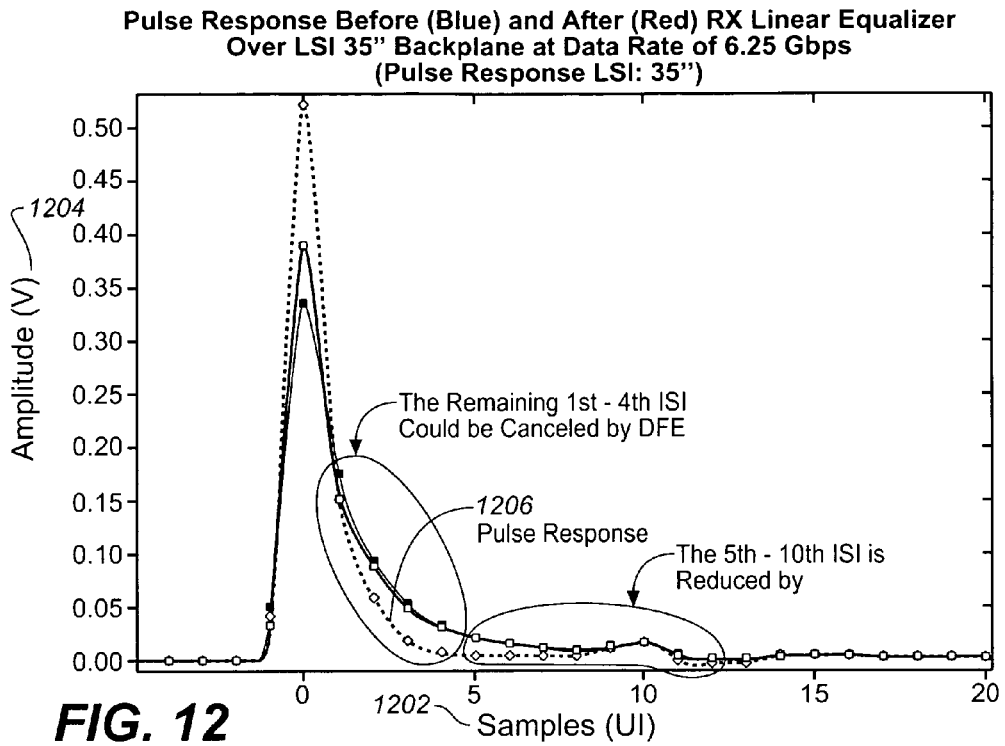
FIG. 12 is a graph showing pulse response before and after receiver (RX) linear equalizer over LSI 35" backplane at data rate of 6.25 Gbps in accordance with an illustrative embodiment.

With reference now to FIG. 12, a graph showing pulse response before and after receiver (RX) linear equalizer over LSI 35" backplane at data rate of 6.25 Gbps is depicted in accordance with an illustrative embodiment. The graph shows signal samples in unit intervals (UI) 1202 depicted on the X-Axis and signal amplitude in Volts (V) 1204 depicted on the Y-Axis. The plot line 1206 marked "Pulse response" is the pulse response after receiver (RX) linear equalizer. The graph shows the pulse response over LSI 35" backplane before and after receiver (RX) linear equalizer at data rate of 6.25 Gbps. The "Pulse response" plot line 1206 shows points the plot line that are one unit interval (UI) apart and show the cursor, pre-cursor and post-cursor inter-symbol interference (ISI). A unit interval is the time duration of a bit. The receiver (RX) linear equalizer can significantly reduce fifth to tenth tap of post-cursor inter-symbol interference (ISI). The first 4-tap inter-symbol interferences (ISI) does not change too much because the linear equalizer does not provide the required high-frequency boost. However, 4-tap decision feedback equalizer (DFE) is followed in the receiver to remove those first through fourth tap inter-symbol interferences (ISI).

Transmitter (TX) pre-emphasis can also remove the long decaying inter-symbol interference (ISI) tail. However, the transmitter (TX) emphasis normally provides high-frequency boost, which causes noise enhancement and crosstalk enhancement. The receiver (RX) linear equalizer only boosts low-frequency signal and the amount of boosting it provides is relatively low, so it doesn't enhance crosstalk and noise that much.

However, the linear equalizer normally works well on smooth channel loss, but not on bumpy inter-symbol interference (ISI) caused by reflection. From FIG. 12, it is evident that bumpy inter-symbol interference (ISI) at ninth and tenth-tap is hardly reduced by linear equalizer.

With reference now to FIG. 13, a table showing the difference in signal-to-noise ratio (SNR) with and without the linear equalizer is depicted in accordance with an illustrative embodiment. The table shows the simulation results of signal-to-noise ratio (SNR) improvement with receiver (RX) linear equalizer over different backplanes. The linear equalizer is shown to improve signal-to-noise ratio (SNR) up to 3 dB. For CAT 6K, the combination of 4-tap decision feedback equalizer (DFE) plus linear equalizer has equivalent performance as a 7-tap decision feedback equalizer (DFE). Because receiver (RX) linear equalizer removes fifth through tenth inter-symbol interference (ISI) tap, the Zephyr receiver equalization (4-tap decision feedback equalizer (DFE)+linear equalizer) is equivalent to 5 to 10-tap decision feedback equalizer (DFE).

It is necessary for the linear equalizer to be adaptive. Because the goal of the linear equalizer is to reduce the fifth through tenth tap inter-symbol interference (ISI), the information of "dummy" 10 tap decision feedback equalizer (DFE) is used to do the adaptation.

The gradient equation of the first 4-tap decision feedback equalizer (DFE), $h_1$, $h_2$, $h_3$, $h_4$, can be extended to $h_5$, $h_6$, $h_8$, $h_9$, $h_{10}$, even though decision feedback equalizer (DFE) taps $h_5$-$h_{10}$ don't exist. The up (UP) and down (DN) results of the gradient equation of $h_5$-$h_{10}$ can then be used to adapt linear equalizer gain. If most of $h_5$-$h_{10}$ tap weights need to go up, the linear equalizer gain will go up. Conversely, if most of $h_5$-$h_{10}$ tap weights need to go down, the linear equalizer gain will go down.

Because all decision feedback equalizer (DFE) taps adapt independently, the adaptations of 4-tap decision feedback equalizer (DFE) and linear equalizer can be done at the same time. Both of them can use same adaptation bandwidth. However, to avoid unnecessary coupling issues, it is preferable to turn on decision feedback equalizer (DFE) adaptation first and set the linear equalizer gain fixed at initial value, say n=0. Until $h_1$-$h_4$ settle, the linear equalizer gain adaptation can be turned on. In the mean time, the decision feedback equalizer (DFE) adaptation is still on because when the linear equalizer gain increases or decreases, the tap values of h1-$h_4$ may change as well.

A sign-sign version of the least mean squares (LMS) algorithm will be used to adapt the equalizer gain, $g_{le}$=n*k, where n and k are defined in Section A.

Define $g_{le}$ as a vector of equalizer gain with possible eight or more settings and $i_k$ as the index selecting the equalizer gain value at time k. Thus, the gain value at time k is given by $g_{le}(i_k)$. The eight settings of $g_{le}$ is listed in Table 16.

The error signal is calculated as $$e_k = \text{sign}(\hat{d}_k * \gamma_k - q_k)$$

where $q_k$ is the signal at the input to the slicer at time k, and $\hat{d}_k$ is the estimate of the data at time k at the output of the slicer, $\gamma_k$ is the target level at time k, $e_k \in \{+1,-1\}$, and $\hat{d}_k \in \{+1,-1\}$. Written another way, $e_k$ is determined as shown in the table of FIG. 15.

It is in the same manner that the error signal will be calculated for the timing, decision feedback equalizer (DFE) and gain loops.

A counter $\eta_k$ adjusts every 4T as follows $$\eta_k = \eta_{k-4} - \Delta\eta_k,$$

where $$\Delta\eta_k = sgn\left(\sum_{j=1}^{5} \Delta\eta_k^j\right), \quad (1)$$

$$\Delta\eta_k^1 = sgn((e_k * \hat{d}_{k-5}) + (e_{k-1} * \hat{d}_{k-6}) + (e_{k-2} * \hat{d}_{k-7}) + (e_{k-3} * \hat{d}_{k-8})),$$

$$\Delta\eta_k^2 = sgn((e_k * \hat{d}_{k-6}) + (e_{k-1} * \hat{d}_{k-6}) + (e_{k-2} * \hat{d}_{k-8}) + (e_{k-3} * \hat{d}_{k-9})),$$

$$\Delta\eta_k^3 = sgn((e_k * \hat{d}_{k-7}) + (e_{k-1} * \hat{d}_{k-8}) + (e_{k-2} * \hat{d}_{k-9}) + (e_{k-3} * \hat{d}_{k-10})),$$

$$\Delta\eta_k^4 = sgn((e_k * \hat{d}_{k-8}) + (e_{k-1} * \hat{d}_{k-9}) + (e_{k-2} * \hat{d}_{k-10}) + (e_{k-3} * \hat{d}_{k-11})),$$

$$\Delta\eta_k^5 = sgn((e_k * \hat{d}_{k-9}) + (e_{k-1} * \hat{d}_{k-10}) + (e_{k-2} * \hat{d}_{k-11}) + (e_{k-3} * \hat{d}_{k-12})),$$

"sgn" represents the sign of the signal and can be positive or negative sign.

$k \in \{0,4,8 \ldots\}$, and $\Delta\eta_k \in \{-1,0,1\}$.

For the real implementation, the gradient equation, equation 1, can be simplified as following:

If two or more $\Delta\eta_k^j$ are 1, $\Delta\eta_k$=1. j={1, 2, 3, 4, 5}.
If two or more $\Delta\eta_k^j$ are −1, $\Delta\eta_k$=−1. j={1, 2, 3, 4, 5}.

An UP signal is sent to the accumulator when $\Delta\eta_k$=1. A DN signal is sent to the accumulator when $\Delta\eta_k$=−1.

The index, and consequently, the selected value equalizer gain is updated as follows:

```
if (η_k >= μ_le)
    i_k = min(i_{k-4} + 1,I ) % Increment if not at maximum value
    η_k =0
else if (η_k<=(- μ_le))
    i_k = max(i_{k-4} − 1,0) % Decrement if not at minimum value
    η_k =0
end
```

$\mu_{le}$ controls the bandwidth of the equalizer gain adaptation loop and will have eight possible values $\{2^5, 2^6, 2^8, 2^{10}, 2^{12}, 2^{14}, 2^{16}, 2^{18}\}$. I is the maximum index number. I=7 or higher.

With reference now to FIG. 14, a table of equalizer gain vector is depicted in accordance with an illustrative embodiment. As described above, $g_{le}$ is defined as a vector of equalizer gain with possible eight or more settings and $i_k$ as the index selecting the equalizer gain value at time k. Thus, the gain value at time k is given by $g_{le}(i_k)$. The table shows eight settings of $g_{le}$.

With reference now to FIG. 15, a table of error signal values is depicted in accordance with an illustrative embodiment. The table shows several values of the error signal corresponding to the values of estimate of data, and signal at the input to the slicer at any given time.

Figure 16:
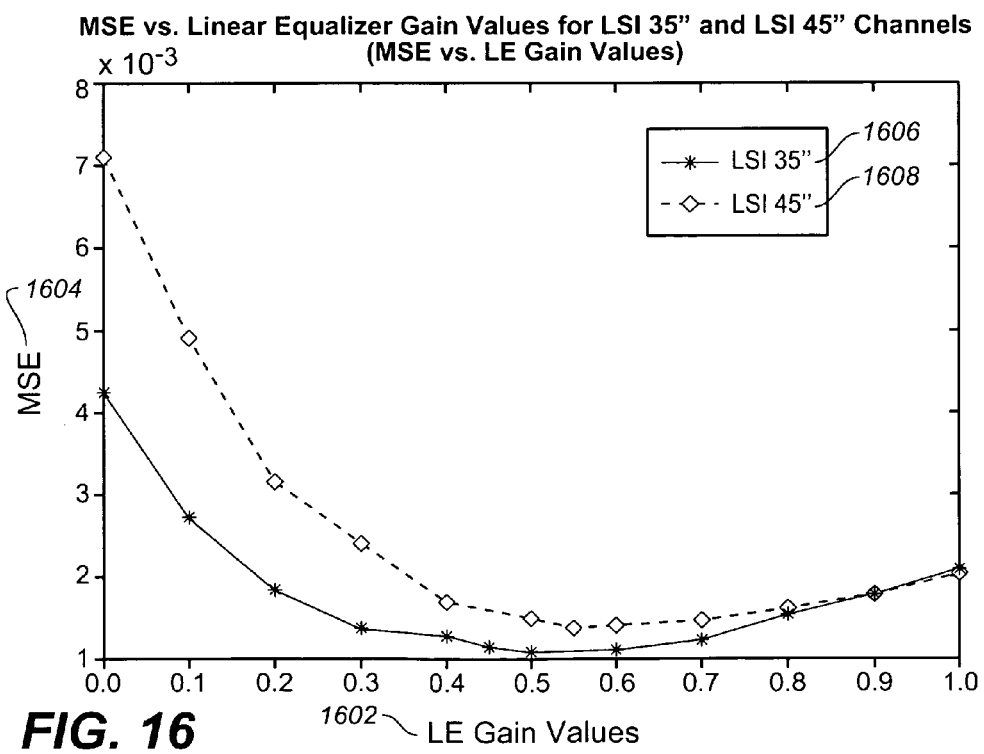
FIG. 16 is a graph of linear equalizer values versus MSE in accordance with an illustrative embodiment.

With reference now to FIG. 16, a graph of linear equalizer gain values 1602 versus MSE 1604 is depicted in accordance with an illustrative embodiment. The graph results from the verification of the proposed adaptation algorithm on LSI 35"

and LSI 45" backplanes with data rate of 6.25 Gbps. The graph shows the linear equalizer gain values vs. MSE for those two channels. The plot line corresponding to line style 1606 depicts the plot for LSI 35" backplane. The plot line corresponding to line style 1608 depicts the plot for LSI 45" backplane. It can be seen that the optimal equalizer gain values for LSI 35" and LSI 45" are 0.45 and 0.55, respectively. 6.25 Gbps data rate was used only as an example for this implementation and is not intended to be limiting on the illustrative embodiments. Other data rates are possible and those of ordinary skill in the art will be able to use other transmission speeds depending on specific implementations.

Figure 17:
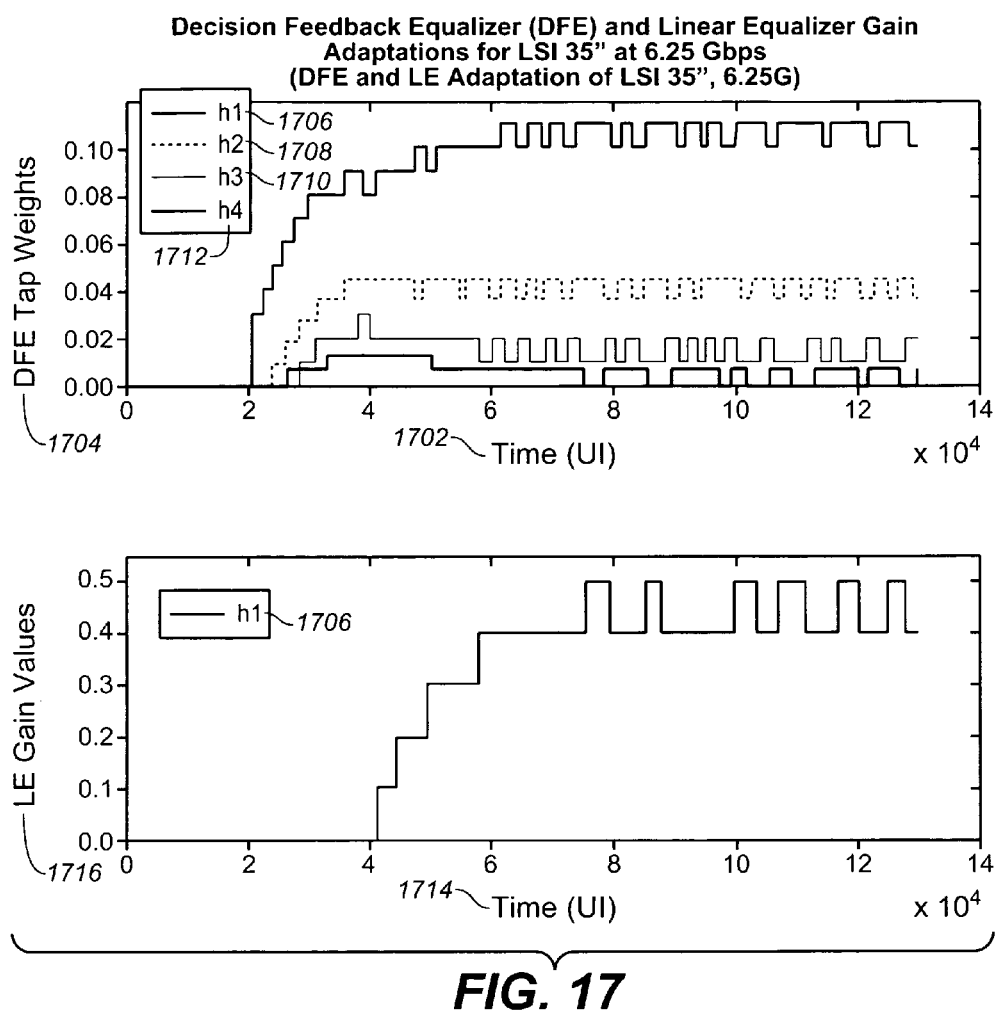
FIG. 17 is graphs showing the adaptation of decision feedback equalizer (DFE) and linear equalizer gain for one channel in accordance with an illustrative embodiment.

With reference now to FIG. 17, graphs showing the adaptation of decision feedback equalizer (DFE) and linear equalizer gain for LSI 35" channel are depicted in accordance with an illustrative embodiment. The graphs show that the equalizer gain settles at the optimal value for the channel. The first graph shows time in unit intervals (UI) 1702 depicted on the X-Axis and decision feedback equalizer (DFE) tap weights 1704 depicted on the Y-Axis. The plot line corresponding to line style 1706 depicts the plot for h1. The plot line corresponding to line style 1708 depicts the plot for h2. The plot line corresponding to line style 1710 depicts the plot for h3. The plot line corresponding to line style 1712 depicts the plot for h4.

The second graph shows time in unit intervals (UI) 1714 depicted on the X-Axis and linear equalizer (LE) tap weights 1716 depicted on the Y-Axis. The plot line corresponds to line style 1706 and depicts the plot for h1.

Figure 18:
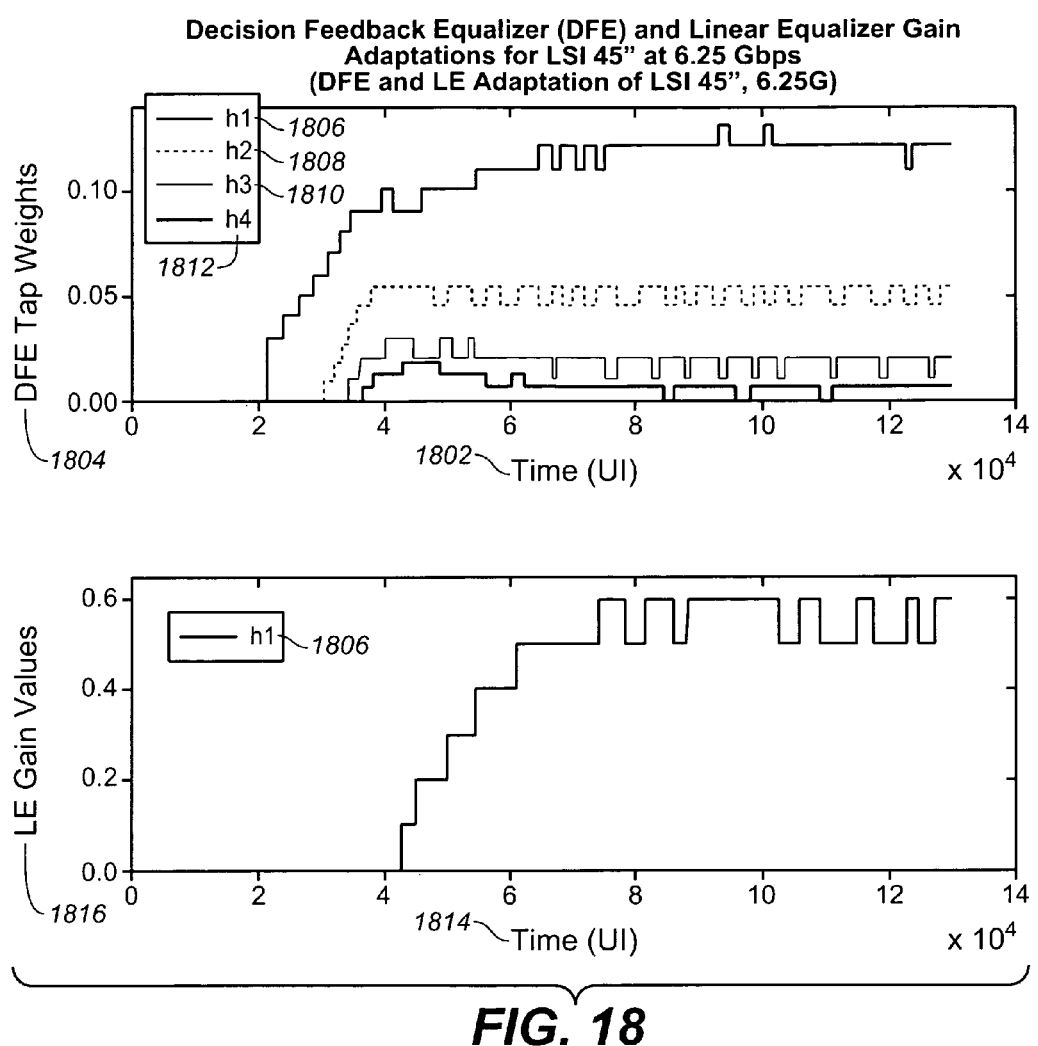
FIG. 18 is graphs showing the adaptation of decision feedback equalizer (DFE) and linear equalizer gain for a different channel in accordance with an illustrative embodiment.

With reference now to FIG. 18, graphs showing the adaptation of decision feedback equalizer (DFE) and linear equalizer gain for LSI 45" channel are depicted in accordance with an illustrative embodiment. The graphs show that the equalizer gain settles at the optimal value for the channel. The first graph shows time in unit intervals (UI) 1802 depicted on the X-Axis and decision feedback equalizer (DFE) tap weights 1804 depicted on the Y-Axis. The plot line corresponding to line style 1806 depicts the plot for h1. The plot line corresponding to line style 1808 depicts the plot for h2. The plot line corresponding to line style 1810 depicts the plot for h3. The plot line corresponding to line style 1812 depicts the plot for h4.

The second graph shows time in unit intervals (UI) 1814 depicted on the X-Axis and linear equalizer (LE) tap weights 1816 depicted on the Y-Axis. The plot line corresponds to line style 1806 and depicts the plot for h1.

The description of the illustrative embodiments of the present invention have been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application to enable others of ordinary skill in the art to understand the invention for various embodiments, with various modifications as are suited to the particular use contemplated.

What is claimed is:

1. A hybrid receiver equalizer in a system comprising:
a first circuit that produces linear equalization, wherein the first circuit includes a component that implements an adjustable high-pass function, a variable gain linear amplifier, and an analog adaptive linear equalizer that uses continuous-time linear equalization, wherein the variable gain linear amplifier is connected directly to the component and directly to the analog adaptive linear equalizer, and wherein the variable gain linear amplifier is connected between the component and the analog adaptive linear equalizer; and
a second circuit that includes an adaptive decision feedback equalizer that implements a discrete-time decision feedback equalization,
wherein the second circuit receives an output of the analog adaptive linear equalizer of the first circuit, and wherein the first and second circuits provide for cancellation of inter-symbol interference to provide an equalization scheme that provides a band-pass function.

2. The hybrid receiver equalizer of claim 1, wherein the analog adaptive linear equalizer has a high-order high roll-off with at least −40 decibels/decade reduction in noise.

3. The hybrid receiver equalizer of claim 1, wherein the decision feedback equalizer uses at least one of a discrete-time single-tap decision feedback equalization and a discrete-time multi-tap decision feedback equalization for targeting a plurality of large inter-symbol interference taps.

4. The hybrid receiver equalizer of claim 1
wherein the variable gain amplifier provides a coarse gain adjustment to adjust gain in large increments; and further comprising:
a slicer, wherein the slicer has an adjustable reference level that provides a fine gain adjustment to adjust gain in small increments.

5. The hybrid receiver equalizer of claim 1, wherein the component outputs a first signal that is received by the variable gain linear amplifier and the variable gain linear amplifier outputs a second signal that is received by the analog adaptive linear equalizer.

6. The hybrid receiver equalizer of claim 1, wherein an output of the component is combined with an output of a baseline wander compensation circuit to form an input to the variable gain linear amplifier.

7. The hybrid receiver equalizer of claim 6, wherein an adaptive control loop provides an input into the component, the baseline wander compensation circuit, the variable gain linear amplifier, and the analog adaptive linear equalizer, and wherein the adaptive control loop receives as its input an output of the second circuit.

8. The hybrid receiver equalizer of claim 1, wherein the second circuit includes the adaptive decision feedback equalizer, a plurality of comparators, and a clock and data recovery unit.

9. The hybrid receiver equalizer of claim 1, wherein the first circuit is an analog circuit and the second circuit is a digital circuit.

10. A transmission system, the system comprising:
a high-speed transmitter for sending a high-speed transmission;
a high-speed receiver for receiving the high-speed transmission;
a low-speed transmitter for sending a low-speed transmission;
a low-speed receiver for receiving the low-speed transmission;
a physical link that is shared by the high-speed transmission and the low speed transmission, wherein the high-speed transmitter communicates with the high-speed receiver using the physical link, and wherein the low-speed transmitter communicates with the low-speed receiver using the physical link; and
a controlling system for channel equalization, the controlling system comprising:
a first circuit that produces linear equalization, wherein the first circuit includes a component that implements an adjustable high-pass function, a variable gain linear amplifier, and an analog adaptive linear equalizer that uses continuous-time linear equalization, wherein the variable gain linear amplifier is connected directly to the component and directly to the analog adaptive linear equalizer, and wherein the variable gain linear amplifier is connected between the component and the analog adaptive linear equalizer; and a second circuit that includes an adaptive decision feedback equalizer that implements a discrete-time decision feedback equalization, wherein the second circuit receives an output of the analog adaptive linear equalizer of the first circuit, and wherein the first and second circuits provide an equalization scheme that provides a band-pass function.

11. The transmission system of claim 10, wherein the high-speed transmission and the low-speed transmission occur bidirectionally through the physical link.

12. The transmission system of claim 11, wherein the high-speed transmission and the low-speed transmission transmit through differential signaling.

13. The transmission system of claim 10, wherein the component outputs a first signal that is received by the variable gain linear amplifier and the variable gain linear amplifier outputs a second signal that is received by the analog adaptive linear equalizer.

14. The transmission system of claim 10, wherein an output of the component is combined with an output of a baseline wander compensation circuit to form an input to the variable gain linear amplifier.

15. The transmission system of claim 14, wherein an adaptive control loop provides an input into the component, the baseline wander compensation circuit, the variable gain linear amplifier, and the analog adaptive linear equalizer, and wherein the adaptive control loop receives as its input an output of the second circuit.

16. The transmission system of claim 10, wherein the second circuit includes the adaptive decision feedback equalizer, a plurality of comparators, and a clock and data recovery unit.

17. The transmission system of claim 10, wherein the first circuit is an analog circuit and the second circuit is a digital circuit.

* * * * *